(12) United States Patent
Tseng et al.

(10) Patent No.: US 12,138,532 B2
(45) Date of Patent: Nov. 12, 2024

(54) HEAD-MOUNTED DISPLAY DEVICE

(71) Applicant: HTC Corporation, Taoyuan (TW)

(72) Inventors: Jian-Zhi Tseng, Taoyuan (TW);
Chang-Hsueh Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 320 days.

(21) Appl. No.: 17/844,063

(22) Filed: Jun. 20, 2022

(65) Prior Publication Data

US 2023/0405453 A1 Dec. 21, 2023

(51) Int. Cl.
*A63F 13/24* (2014.01)
*A63F 13/26* (2014.01)

(52) U.S. Cl.
CPC .............. *A63F 13/26* (2014.09); *A63F 13/24* (2014.09); *A63F 2300/1037* (2013.01); *A63F 2300/1043* (2013.01); *A63F 2300/8082* (2013.01)

(58) Field of Classification Search
CPC .............. A63F 13/24; A63F 2300/1037; A63F 2300/1043; A63F 2300/8082
See application file for complete search history.

(56) References Cited

U.S. PATENT DOCUMENTS

| 10,898,798 B2 | 1/2021 | Chapman et al. |
| 2018/0280556 A1 | 10/2018 | Fateh |
| 2019/0192965 A1* | 6/2019 | Chapman ................. A63F 13/50 |
| 2021/0385954 A1 | 12/2021 | Chang et al. |

FOREIGN PATENT DOCUMENTS

| CN | 205164154 U | * | 4/2016 | |
| CN | 106823415 A | * | 6/2017 | .............. A63J 25/00 |
| CN | 110209284 A | * | 9/2019 | .............. G02B 27/01 |
| CN | 106823415 | | 4/2021 | |
| CN | 112954982 | | 6/2021 | |
| RU | 2162724 C2 | * | 2/2001 | .............. A61L 9/125 |
| WO | WO-2013025823 A2 | * | 2/2013 | .......... A61H 23/0236 |
| WO | WO-2018227424 A1 | * | 12/2018 | .......... G02B 27/0172 |

OTHER PUBLICATIONS

Julian Horsey, "ZephVR Virtual Reality Wind Simulation Accessory Successfully Funded", Geeky Gadgets, Nov. 7, 2017, pp. 1-3, retrieved from "https://www.geeky-gadgets.com/zephvr-virtual-reality-wind-simulation-07-11-2017/".
"Feelreal Mask for HTC Vive", Feelreal, Inc., pp. 1-10, retrieved from "https://feelreal.com/product/feelreal-mask-for-htc-vive/".
"Office Action of Taiwan Counterpart Application", issued on Jun. 19, 2023, p. 1-p. 5.

* cited by examiner

*Primary Examiner* — Steven J Hylinski
(74) *Attorney, Agent, or Firm* — JCIPRNET

(57) ABSTRACT

A head-mounted display device includes a main body and a first simulator connected to the main body. The first simulator includes multiple nozzles, multiple air channels, a first fan, and multiple regulators. The nozzles face the user's eyes. The first fan is configured to drive external air to flow to the corresponding nozzles through the air channels. The regulators are disposed between the air channels and the corresponding nozzles to independently regulate the flow rates of air jetted from the nozzles.

15 Claims, 12 Drawing Sheets

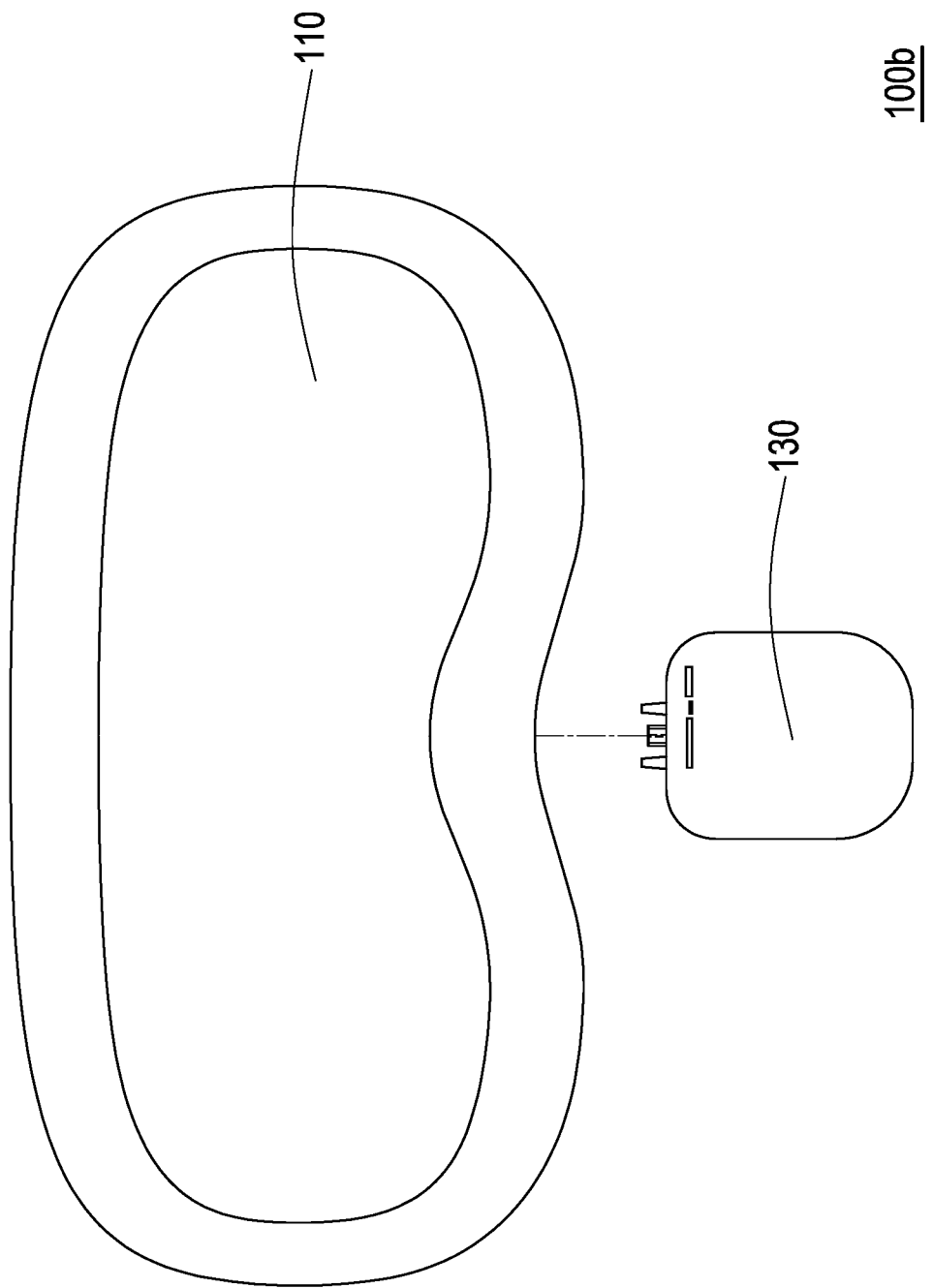

HEAD-MOUNTED DISPLAY DEVICE

TECHNICAL FIELD

The disclosure relates to a head-mounted display device, and more particularly, to a head-mounted display device providing wind field simulation.

DESCRIPTION OF RELATED ART

With the rapid advancement of current technology, the types and functions of head-mounted display devices are also increasingly diversified. Take an eye mask type head-mounted display device as an example, when the user wears such a device, the gyroscope and position tracker inside the head-mounted display device will track the user's movement status to deliver the corresponding scene image, providing the user the experience of being in a virtual world.

Although the current head-mounted display device has a fan which provides wind flow to the user, it mainly aims to reduce the heat on the user's face and the waste heat generated by the head-mounted display device. How to combine the head-mounted display device with the wind flow provided by the fan, so that the user can feel the changing wind direction in the virtual world, is the direction of research in the field.

SUMMARY

The disclosure provides a head-mounted display device capable of providing wind in various directions, so that the user's experience of being immersed in a virtual world is improved.

A head-mounted display device of the disclosure includes a main body and a first simulator connected to the main body. The first simulator includes multiple nozzles, multiple air channels, a first fan, and multiple regulators. The nozzles face eyes of a user. The first fan is configured to drive external air to flow to the corresponding nozzles through the air channels. The regulators are disposed between the air channels and the corresponding nozzles to independently regulate the flow rates of air jetted from the nozzles.

Another head-mounted display device of the disclosure includes a main body and a simulator connected to the main body. The simulator includes a connector, a casing, a fan, a first transmission mechanism, a second transmission mechanism, and a controller. The connector is configured to connect with the main body. The fan is configured to blow wind toward a mouth of a user. The first transmission mechanism is connected to the casing and the fan and configured to control the movement of the fan into and out of the casing. The second transmission mechanism is configured to control the fan to rotate around a first axis. The controller is controlled by the main body to drive the first transmission mechanism and the second transmission mechanism.

Based on the above, in the head-mounted display device of the disclosure, the simulator can provide wind fields in various directions. Such a design allows the user to feel the changing wind direction and wind volume corresponding to the virtual world when wearing the head-mounted display device, so as to provide a multi-sensory experience when the user is immersed in the virtual world.

BRIEF DESCRIPTION OF THE DRAWINGS

FIG. 4 is a schematic view of a head-mounted display device of yet another embodiment of the invention.

DESCRIPTION OF EMBODIMENTS

Figure 1A:
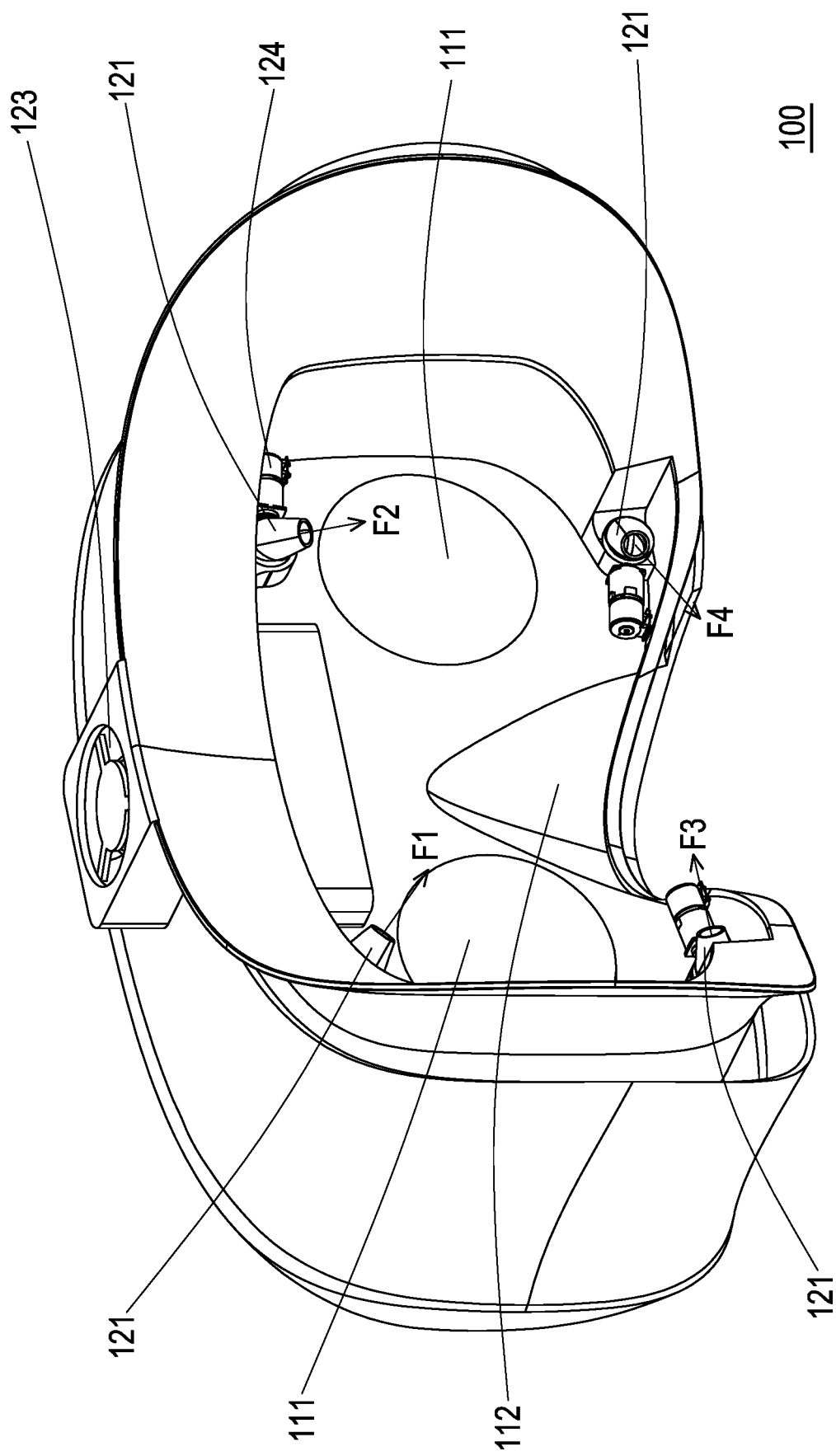
FIG. 1A is a schematic perspective view of a head-mounted display device of an embodiment of the invention.
Figure 1B:
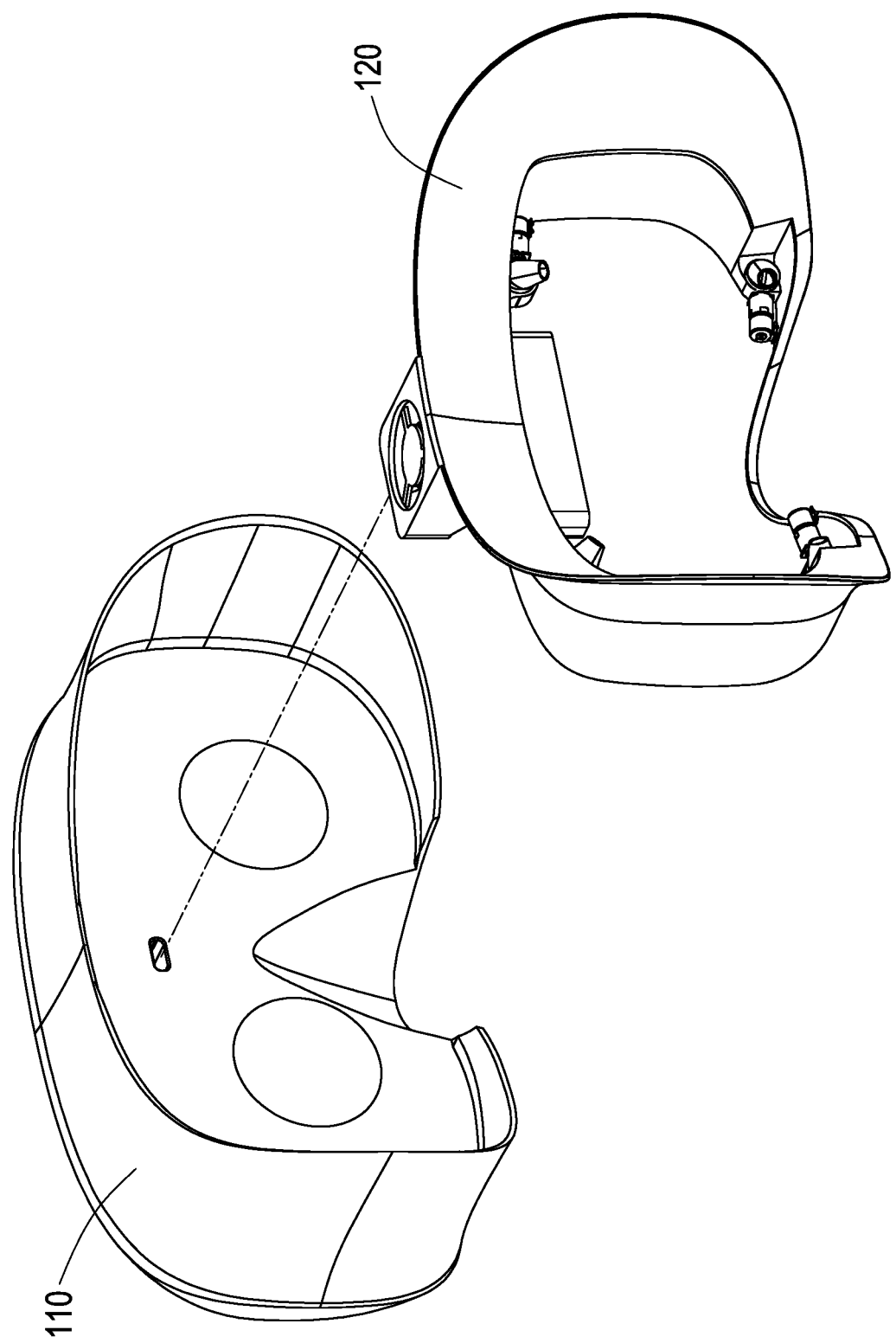
FIG. 1B is a schematic exploded perspective view of the main body and the first simulator of the head-mounted display device of FIG. 1A.

FIG. 1A is a schematic perspective view of a head-mounted display device of an embodiment of the invention. FIG. 1B is a schematic exploded perspective view of the main body and the first simulator of the head-mounted display device of FIG. 1A. Referring to FIG. 1A and FIG. 1B, the head-mounted display device 100 of this embodiment includes a main body 110 and a first simulator 120 connected to the main body 110. The first simulator 120 of the head-mounted display device 100 of this embodiment is detachably connected to the main body 110. However, in other embodiments, they may also be fixedly connected. In this embodiment, the first simulator 120 is, for example, in the shape of an eye mask to cover the eyes of the user.

The main body 110 includes a pair of display regions 111 and a supporting portion 112. When the user wears the head-mounted display device 100, the two display regions 111 align with the user's eyes and provide the user with a picture of the virtual world. The supporting portion 112 rests on the user's nose bridge, so that the two display regions 111 align with the user's eyes more stably, thereby avoiding a bad user experience due to the changing of the relative positions of the two display regions 111 and the eyes as the user's head rotates. Certainly, the head-mounted display device 100 of this embodiment may also include a frame or an elastic band to be worn on the user's head, so that the head-mounted display device 100 can be more stably fixed to the user's face. For example, each display region 111 may include a lens (not shown) and a display (not shown) corresponding to the lens. Therefore, the light emitted by the display passes through the lens and enter the user's eyes.

Figure 2A:
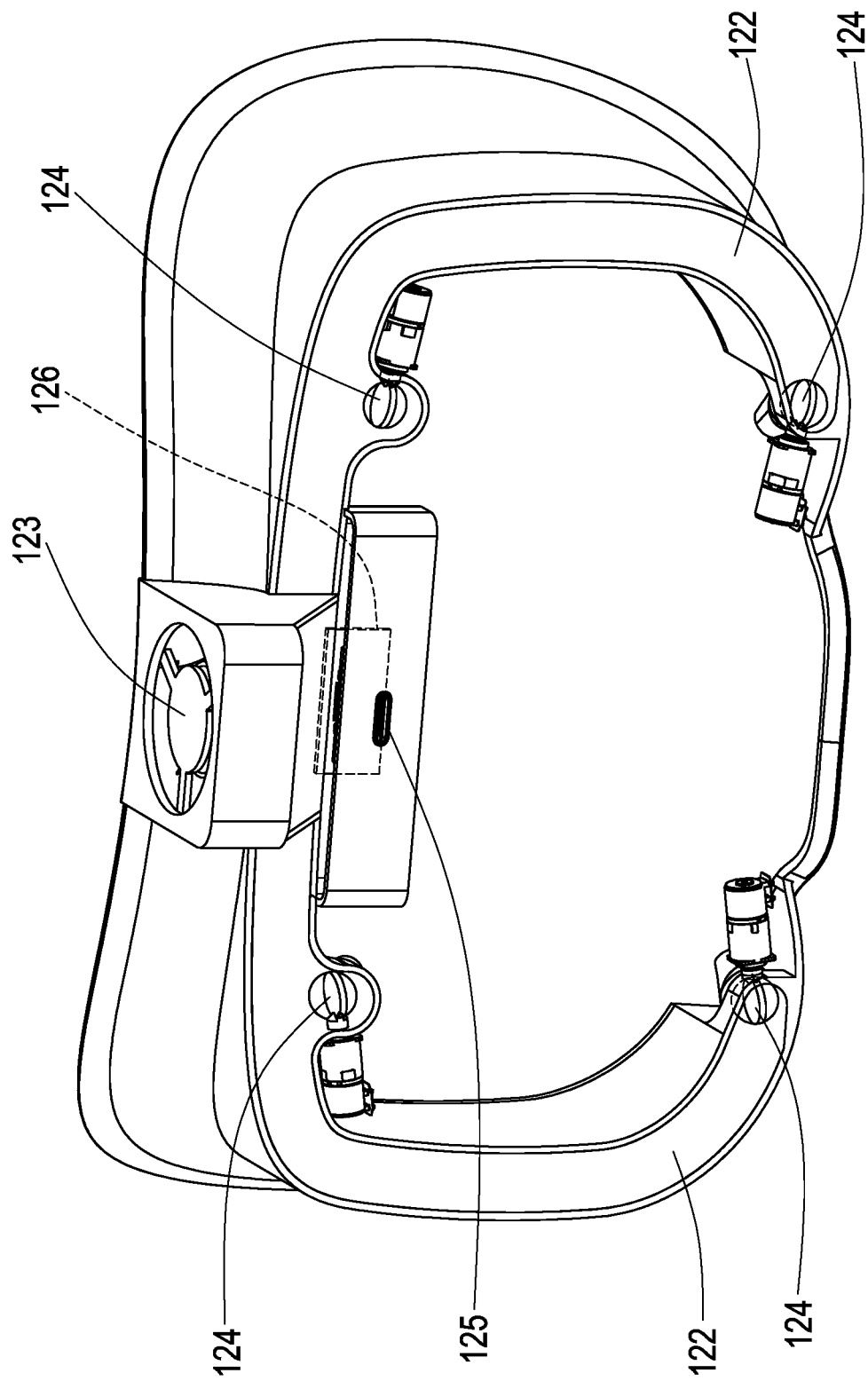
FIG. 2A is a schematic view of the first simulator of FIG. 1B from another viewing angle.

FIG. 2A is a schematic view of the first simulator of FIG. 1B from another viewing angle. Referring to FIG. 1A and FIG. 2A at the same time, the first simulator 120 of this embodiment includes multiple nozzles 121, multiple air channels 122, and a first fan 123, while multiple regulators 124, a connector 125, and a controller 126 are included optionally. The first simulator 120 is connected to the main body 110 through the connector 125, and the controller 126 is driven by the main body 110 through the connector 125 to control the first fan 123 and the regulators 124. The first fan 123 is configured to drive external air to flow to the corresponding nozzles 121 through the air channels 122. Each regulator 124 is disposed between one air channel 122 and one corresponding nozzle 121 to independently regulate the flow rates of air jetted from the nozzles 121. That is, adjustment of the flow rates of air by each regulator 124 is not affected by the other regulators 124. The nozzles 121 face the user's eyes, so that the air in the air channel 122 is jetted towards the user. The number of the first fans 123 of the head-mounted display device 100 of this embodiment is one, but in other embodiments, the number of the first fans 123 may also be more than one.

When the user wears the head-mounted display device 100, the main body 110 detects the direction of rotation of the user's head and projects the corresponding virtual world image, and simultaneously transmits a signal of the corresponding virtual world scene to the controller 126 through the connector 125. After receiving the signal, the controller 126 drives the first fan 123 and controls the volume of the external air drawn in by the first fan 123, and at the same time controls the flow rates of air that can pass through each regulator 124. Each of the regulators 124 independently adjusts the flow rates of air jetted by the corresponding nozzles 121, so the flow rates of air jetted by each nozzle 121 may be different.

In addition, as shown in FIG. 1A, the nozzles 121 of this embodiment are disposed on four corners inside the first simulator 120 (corresponding to the upper part of the user's eyes and the upper half of the cheeks on both sides respectively). Each of the four nozzles 121 is not parallel to each other in the jetting directions F1, F2, F3 and F4. That is, the angles at which the four nozzles 121 jet air are different, and the flow rates of the air jetted from the four nozzles 121 may also be different. Such a design not only allows the user to have a visual experience when wearing the head-mounted display device 100, but also provides wind fields of different scales from different directions in response to various situations, thereby allowing the user to be more immersed in the virtual world. However, in other embodiments, the jetting directions F1, F2, F3, and F4 may all be independent of each other, and are not limited to be parallel to each other or not to be parallel to each other. The disclosure does not limit the jetting directions of these nozzles, but the air jetted from these nozzles should be able to blow to the user's eyes and the vicinity of the eyes, that is, the area where the user's face is covered by the first simulator 120.

It should be noted that, in this embodiment, the number of nozzles 121 and corresponding regulators 124 is four, but the disclosure is not limited thereto. The number of the nozzles 121 and the corresponding regulators 124 is at least two, so that the user can feel the incoming wind from different directions. In addition, the positions of the nozzles 121 and the corresponding regulators 124 may also be changed as required. When the number of the nozzles 121 and the corresponding regulators 124 is more, and the angle of the nozzles 121 is greater, the user can feel the subtle changes in the wind direction and wind volume.

Figure 2B:
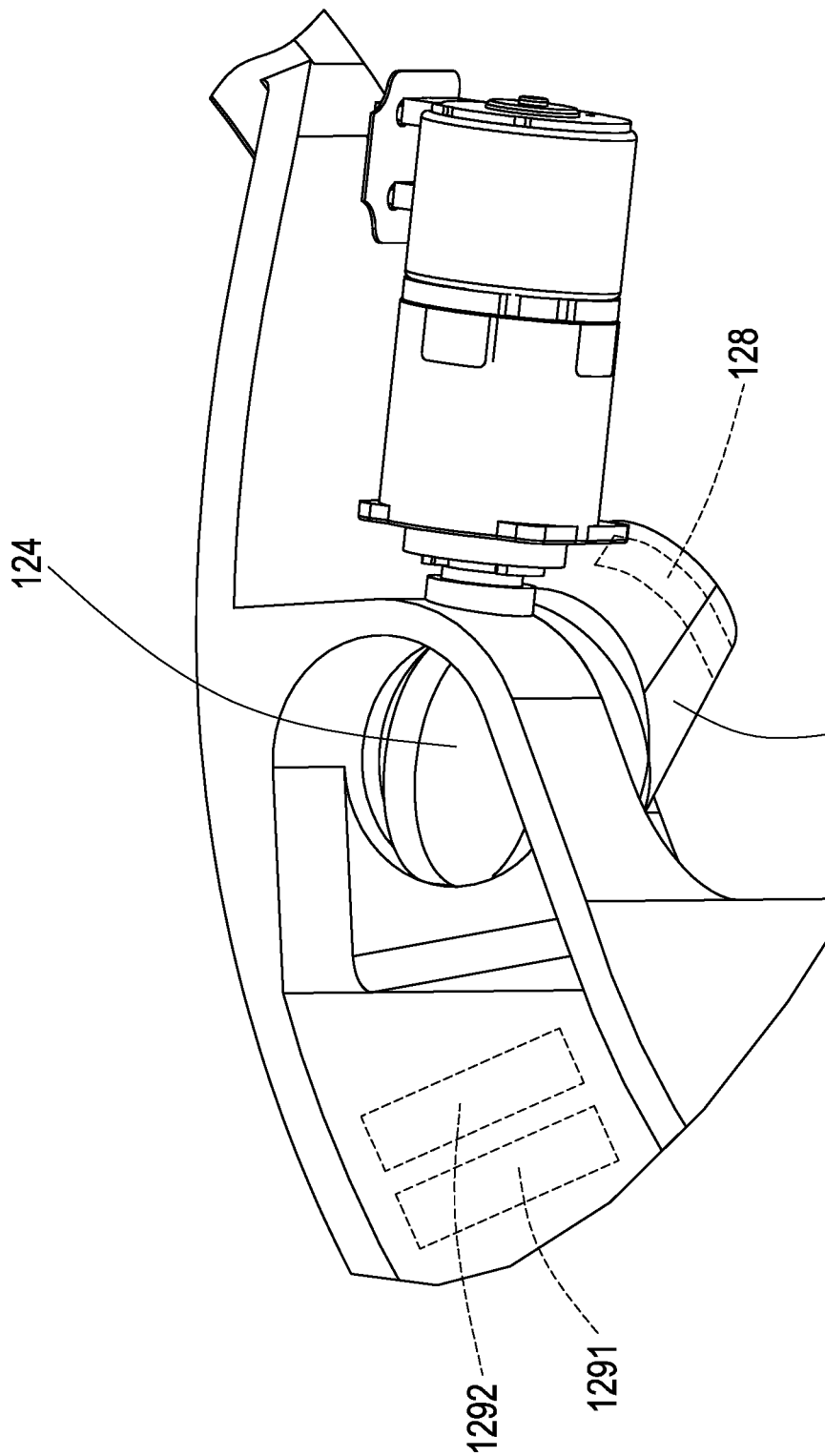
FIG. 2B is a schematic view of the vicinity of the regulator of the first simulator of FIG. 2A.

FIG. 2B is a schematic view of the vicinity of the regulator of the first simulator of FIG. 2A. Referring to FIG. 2B, the first simulator 120 of this embodiment further includes at least one of a thermoregulator 128, a humidity controller 1291, and an odor controller 1292. The thermoregulator 128, the humidity controller 1291, and the odor controller 1292 are configured to control the temperature, the humidity, and the odor of the air sent by the nozzles 121 respectively.

Specifically, the thermoregulator 128 uses, for example, a Peltier module to produce hot or cold air by applying an electric current to multiple groups of chips inside the Peltier module, causing the air jetted from the nozzle 121 to rise or fall in temperature after flowing through the Peltier module. As shown in FIG. 2B, the thermoregulator 128 is disposed at the end of the nozzle 121, while the humidity controller 1291 and the odor controller 1292 are located inside the air channel 122. Such a design allows the external air drawn in by the first fan 123 to flow through the humidity controller 1291, the odor controller 1292, and the thermoregulator 128. Hence, the air sprayed by the nozzle 121 to the user has variations of hot and cold, dry and wet, and different odors, which enhances the multi-sensory experience when immersed in the virtual world.

Similarly, the disclosure does not limit the location and quantity of the humidity controller 1291, the odor controller 1292, and the thermoregulator 128. For example, the thermoregulator 128, the humidity controller 1291, and the odor controller 1292 may be disposed near each nozzle 121. Alternatively, the thermoregulator 128, the humidity controller 1291, and the odor controller 1292 may be disposed near only a few nozzles 121 optionally, or the thermoregulator 128 may be disposed inside the air channel 122.

Figure 2C:
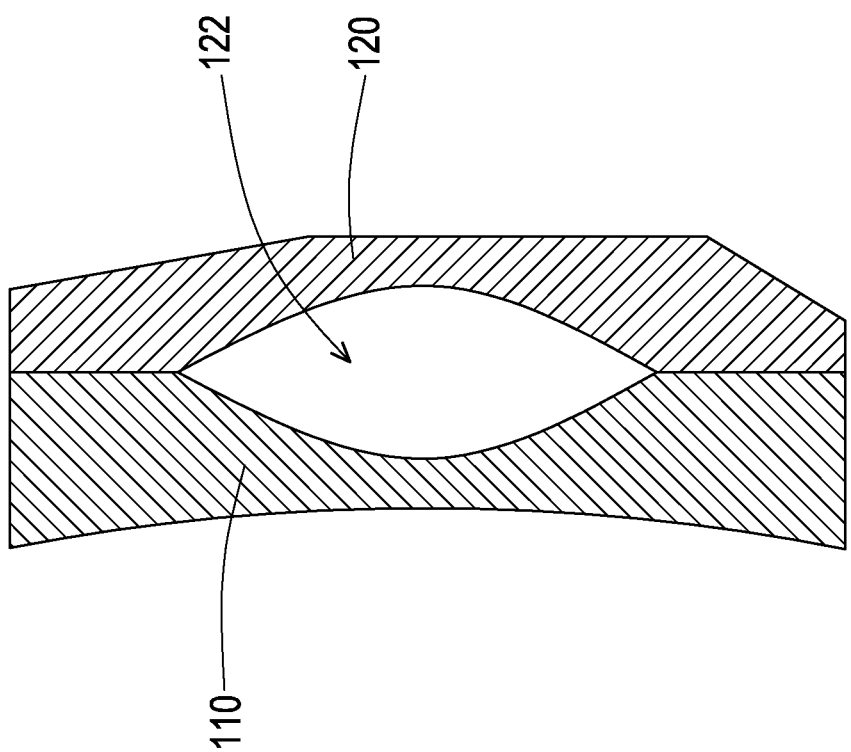
FIG. 2C is a schematic cross-sectional view of the junction of the main body and the first simulator of the head-mounted display device of FIG. 1A.

FIG. 2C is a cross-sectional view of the junction of the main body and the first simulator of the head-mounted display device of FIG. 1A. Referring to FIG. 2C, the main body 110 and the first simulator 120 in this embodiment respectively have concave grooves. After joining the main body 110 and the first simulator 120, the two grooves together form the air channel 122. Such a design simplifies the process of making the air channel 122. In other embodiments, the air channel 122 may also be directly formed inside the first simulator 120.

Figure 3A:
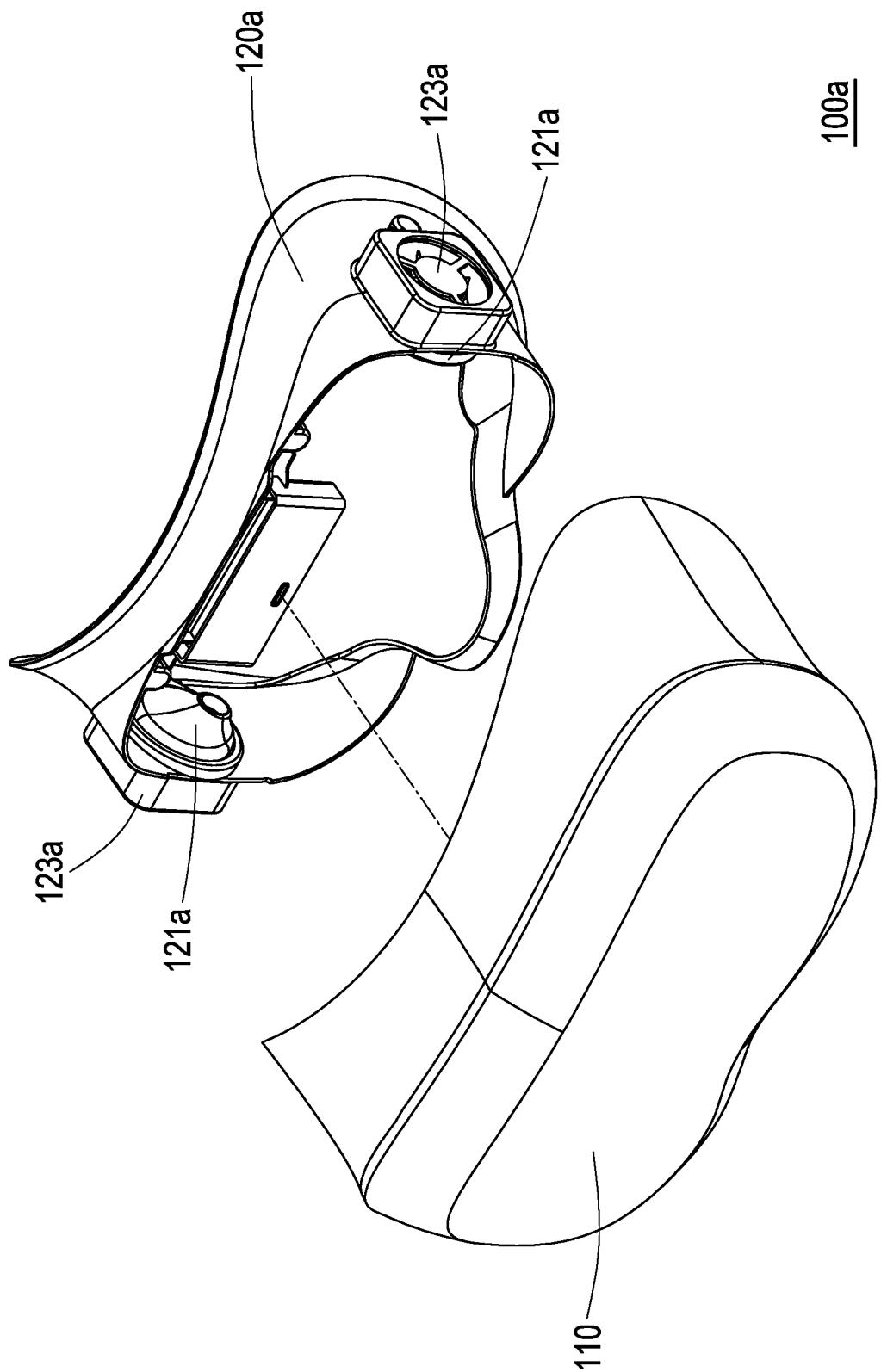
FIG. 3A is a schematic view of an assembly of a head-mounted display device of another embodiment of the invention.
Figure 3B:
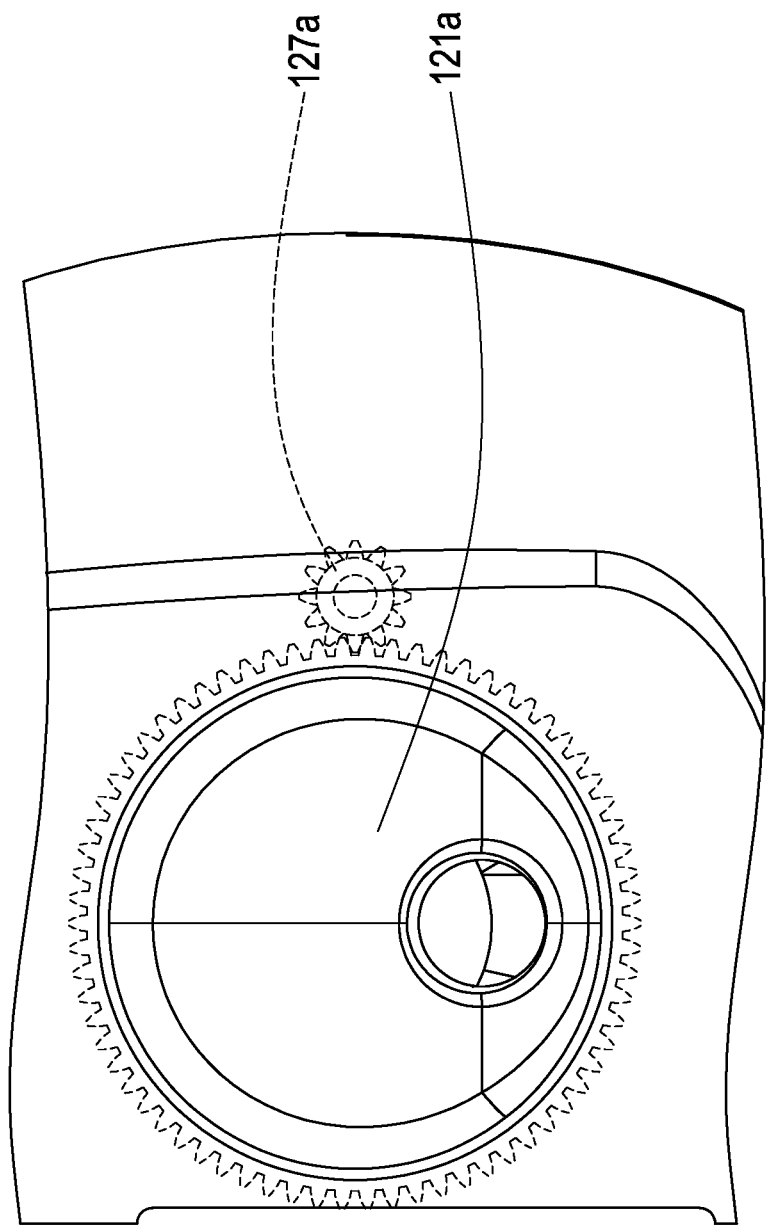
FIG. 3B is a partially enlarged view of the vicinity of the nozzle of the first simulator of the head-mounted display device of FIG. 3A.
Figure 3C:
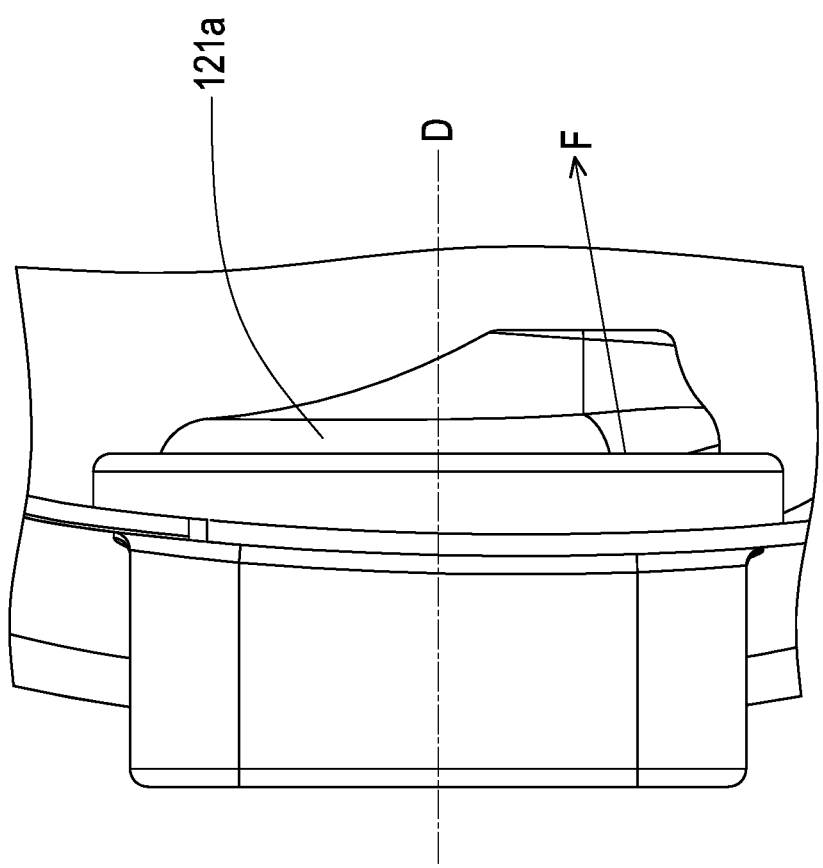
FIG. 3C is a schematic view of the nozzle of the first simulator of FIG. 3B from another viewing angle.

FIG. 3A is a schematic view of an assembly of a head-mounted display device of another embodiment of the invention. FIG. 3B is a partially enlarged view of the vicinity of the nozzle of the first simulator of the head-mounted display device of FIG. 3A. FIG. 3C is a schematic view of the nozzle of the first simulator of FIG. 3B from another viewing angle. Referring to FIG. 3A to FIG. 3C at the same time, the head-mounted display device 100a of this embodiment is substantially the same as the head-mounted display device 100 of FIG. 1A. The differences between them are that each nozzle 121a in this embodiment corresponds to a first fan 123a, and the first simulator 120a further includes multiple transmission modules 127a. Each transmission module 127a is configured to rotate one corresponding nozzle 121a to change its jetting direction.

The transmission module 127a is, for example, a gear set as shown in FIG. 3B, and may also be a transmission structure such as a cam, a connecting rod, etc., but the disclosure is not limited thereto.

The transmission module 127a of this embodiment drives the nozzle 121a to rotate. As shown in FIG. 3C, the nozzle 121a rotates around an axis D, and the jetting direction F of the nozzle 121a does not overlap with and is not parallel to the axis D. That is, when the transmission module 127a drives the nozzle 121a to rotate around the rotation axis D, the position of the opening of the nozzle 121a moves, and the direction of the air jetted by the nozzle 121a to the user also changes accordingly. For example, when the opening of the nozzle 121a of this embodiment is turned to the upper half of FIG. 3C (i.e., above the rotation axis D), the jetting direction F changes from the upper right of FIG. 3C to the lower right of FIG. 3C. Such a design also allows the user to feel the changing wind directions and to be more immersed in the virtual world. In addition, since one nozzle 121a corresponds to one first fan 123a, the flow rates of air jetted by the nozzle 121a are not dispersed by other nozzles 121a, so that the flow rates of air jetted by each nozzle 121a is larger.

It should be noted that, the disclosure does not limit the number and positions of the nozzles 121a, the corresponding first fans 123a, and the corresponding transmission modules 127a. Certainly, the nozzle 121 of the head-mounted display device 100 of FIG. 1A and FIG. 2A may also be provided with the above-mentioned transmission module 127a, thereby diversifying the wind direction. In addition, the nozzle 121 of FIG. 1A and the nozzle 121a of FIG. 3A may be used in the same head-mounted display device simultaneously.

Figure 5A:
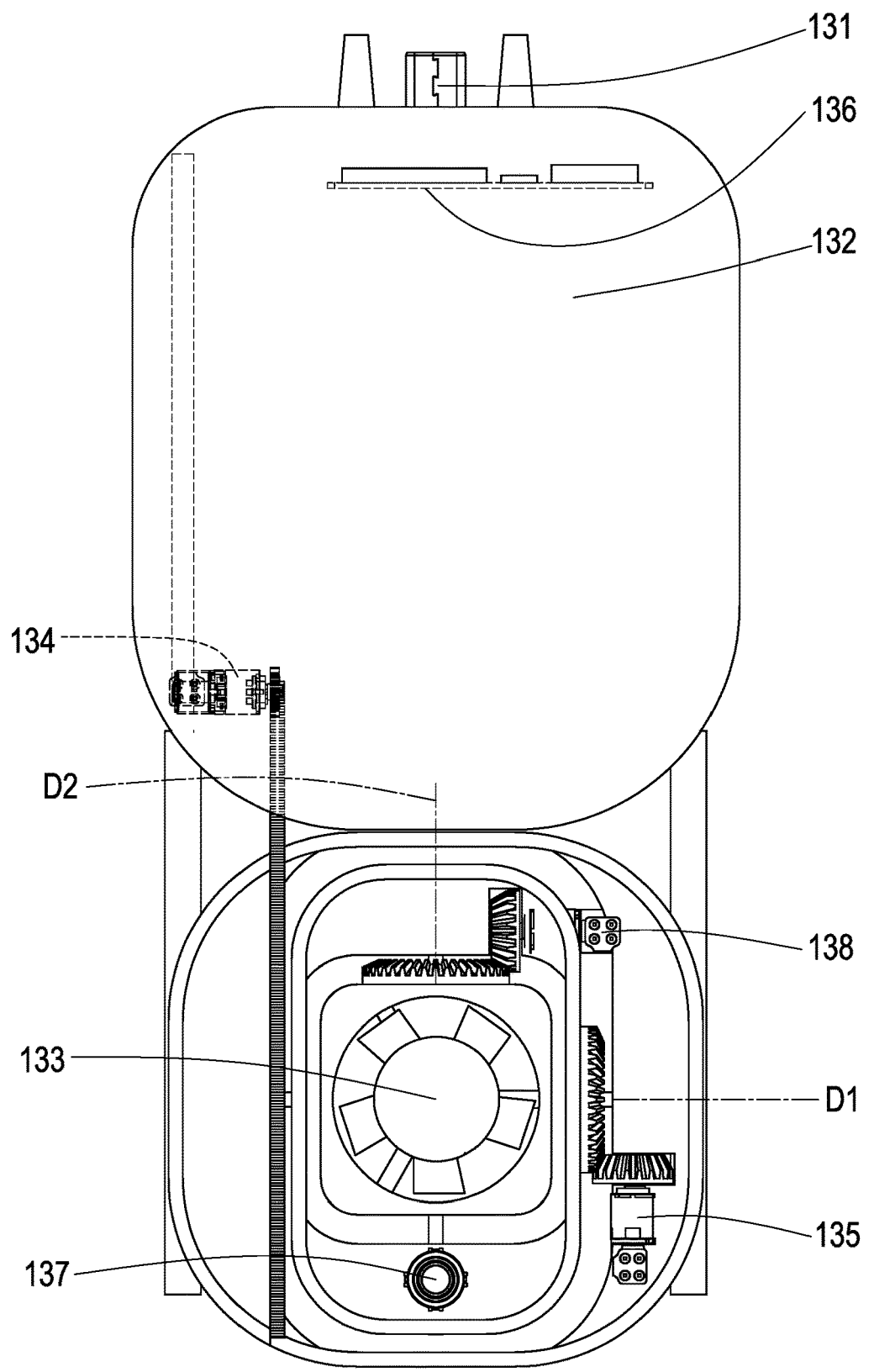
FIG. 5A is a schematic view of the second fan of the second simulator of the head-mounted display device of FIG. 4 moving out of the casing.
Figure 5B:
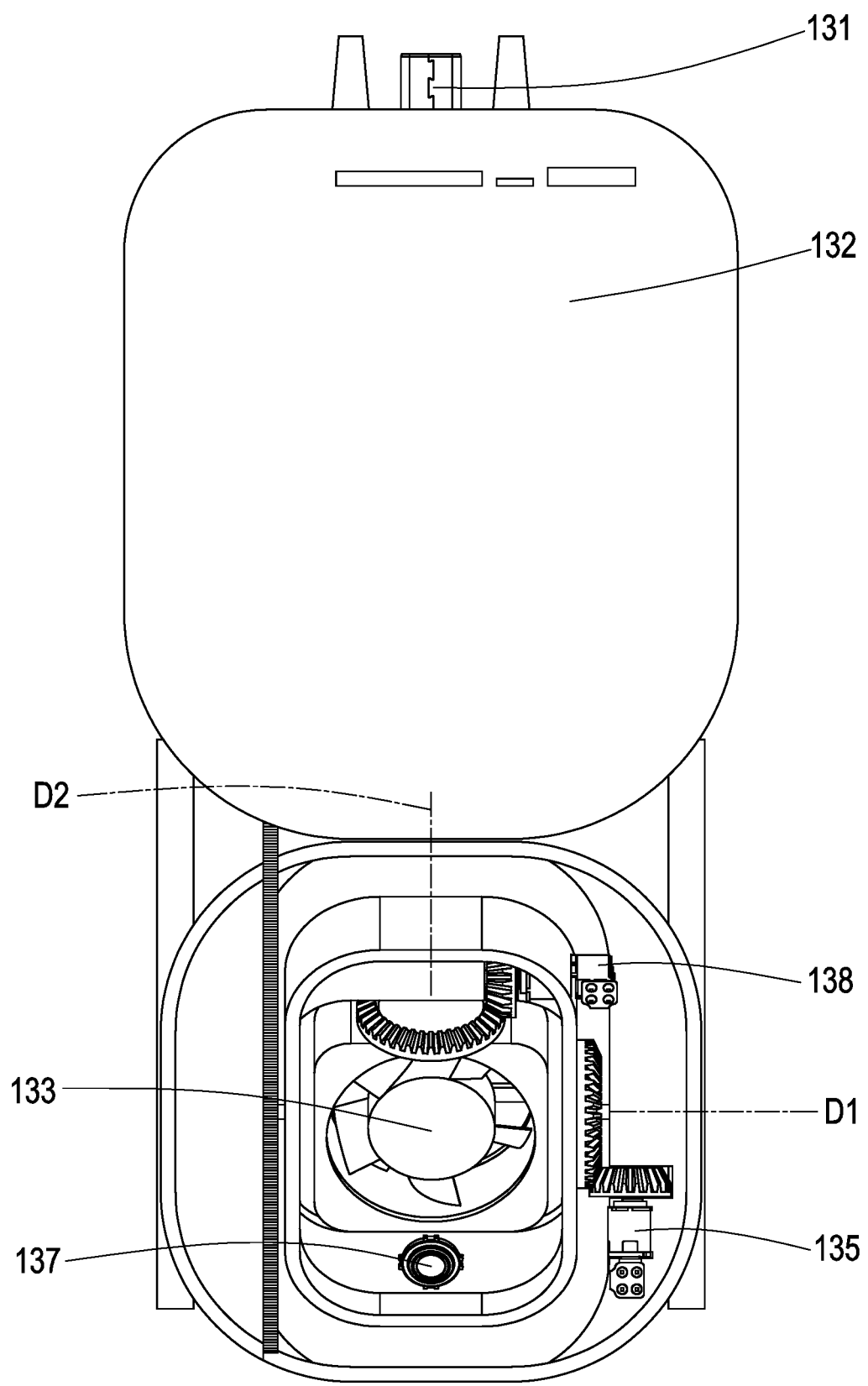
FIG. 5B and FIG. 5C respectively are schematic views of the rotation of the second fan controlled by the second transmission mechanism and the third transmission mechanism of the second simulator of FIG. 5A.
Figure 5C:
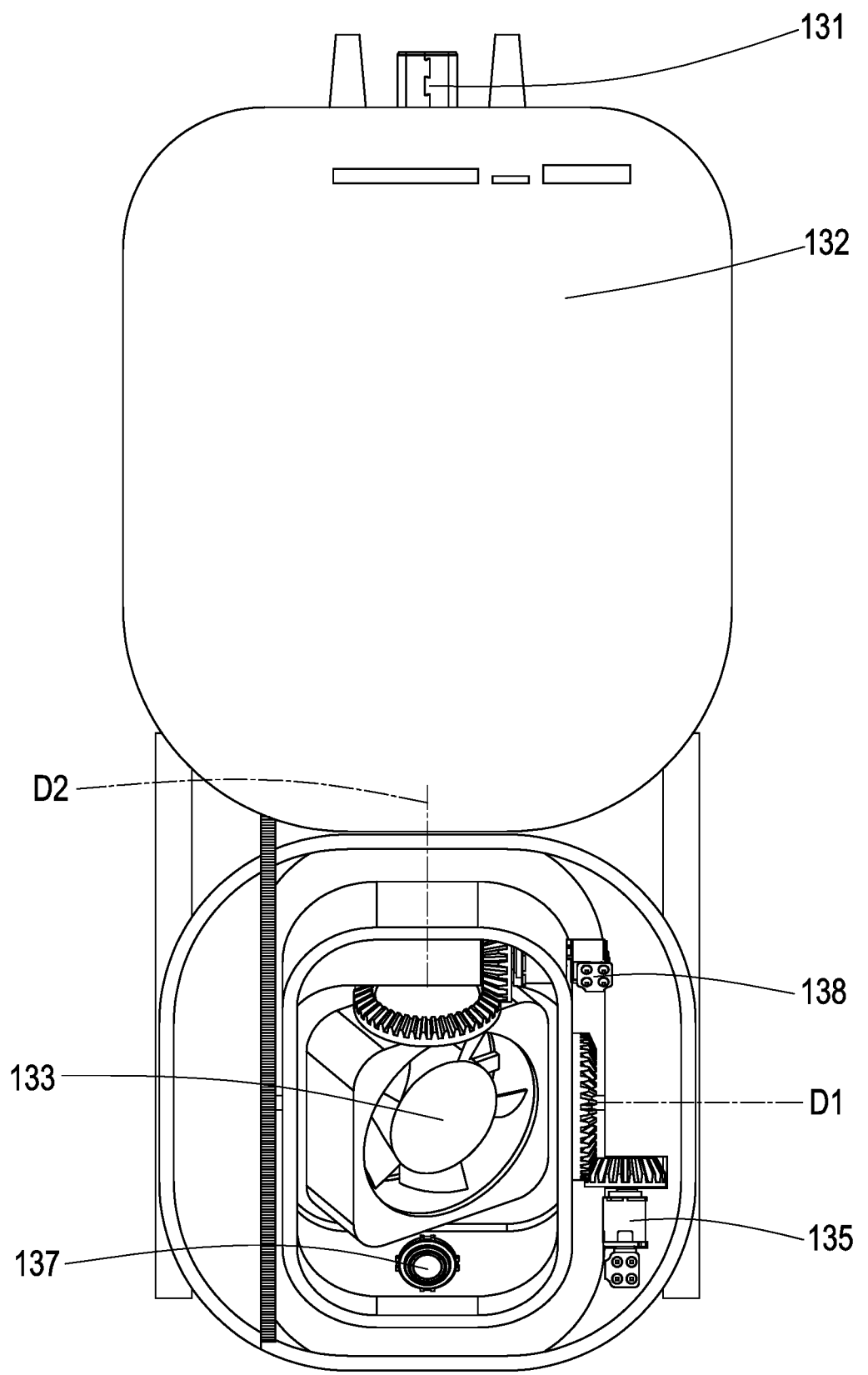

FIG. 4 is a schematic view of a head-mounted display device of yet another embodiment of the invention. FIG. 5A is a partially enlarged view of the second fan of the second simulator of the head-mounted display device of FIG. 4 moving out of the casing. FIG. 5B and FIG. 5C respectively are schematic views of the rotation of the second fan controlled by the second transmission mechanism and the third transmission mechanism of the second simulator of FIG. 5A. Referring to FIG. 4, the head-mounted display device 100b of this embodiment is substantially the same as the head-mounted display device 100 of FIG. 1A. The difference between them is that the head-mounted display device 100b of this embodiment further includes a second simulator 130. That is, the head-mounted display device 100b of this embodiment includes both the first simulator 120 shown in FIG. 1A and the second simulator 130 shown in FIG. 4. Certainly, the first simulator 120 may also be replaced with the first simulator 120a as shown in FIG. 3A. In other embodiments, the head-mounted display device may only include the second simulator 130 of FIG. 4, but not the first simulator 120 of FIG. 1A or the first simulator 120a of FIG. 3A.

Referring to FIG. 4 and FIG. 5A, the second simulator 130 includes a connector 131, a casing 132, a second fan 133, a first transmission mechanism 134, a controller 136, and a camera 137. The second simulator 130 is connected to the main body 110 through the connector 131, and the first transmission mechanism 134 is connected to the casing 132 and the second fan 133. When the second simulator 130 is not in use, the second fan 133 is located inside the casing 132.

Specifically, the main body 110 transmits a corresponding signal to the controller 136 through the connector 131 in response to the change of the image of the virtual world. After receiving the signal from the main body 110, the controller 136 uses the camera 137 to detect the position of the user's mouth, and then drives the first transmission mechanism 134 to control the second fan 133 to move out of the casing 132, so that the second fan 133 aligns with the position of the user's mouth. In addition, the controller 136 drives the second fan 133 so that the second fan 133 blows wind to the user's mouth. Conversely, if the environment in the virtual world is windless, or when the user stops using the head-mounted display device 100, the first transmission mechanism 134 is driven by the controller 136 to control the second fan 133 to move into the casing 132. In this case, the second fan 133 blows wind to the mouth of the user, but the second fan 133 may also blow wind to other parts of the user.

In addition, a side of the casing 132 that faces the user has multiple holes. When the second fan 133 is located in the casing 132, the first transmission mechanism 134 does not drive the second fan 133 to move out of the casing 132 if the camera 137 detects that the position of the second fan 133 already aligns with the user's mouth. The second fan 133 blows wind to the user's mouth through the holes on the casing 132.

Referring to FIG. 5A to FIG. 5C, the second simulator 130 further includes a second transmission mechanism 135 and a third transmission mechanism 138. The second transmission mechanism 135 and the third transmission mechanism 138 are driven by the controller 136 to respectively control the second fan 133 to rotate around a first axis D1 and a second axis D2. The first axis D1 is perpendicular to the second axis D2. That is, for the environment corresponding to the virtual world, the main body 110 drives the controller 136 to drive the second transmission mechanism 135 and the third transmission mechanism 138 to control the rotation of the second fan 133 so that the second fan 133 can rotate to various angles.

In addition, the center of the second fan 133 may be designed to deviate from the first axis D1 and the second axis D2. Such a design results in an unfixed circular axis changing trajectory of the air blown out by the second fan 133 when the second fan 133 is rotated by the second transmission mechanism 135 and the third transmission mechanism 138, thereby diversifying the wind direction.

The second transmission mechanism 135 and the third transmission mechanism 138 of this embodiment are illustrated as the cooperation of the gear set and the motor in FIG. 5A to FIG. 5C. In other embodiments, cams or other transmission designs may be used to achieve the unfixed circular axis trajectory of the second fan 133 when rotating.

It should be noted that, the thermoregulator 128, the humidity controller 1291, and the odor controller 1292 in FIG. 2B may also be disposed on one side of the second fan 133, so that the wind blown by the second fan 133 to the user is more diversified. In addition, the first simulator 120 and the second simulator 130 can be connected to the main body 110 to operate at the same time, so that the user's entire face can experience wind in various directions. The user may also select one of the first simulator 120 and the second simulator 130 to be connected to the main body 110 as required, so that the upper face (eyes and nose) or the lower face (mouth) can experience wind in various directions.

To sum up, in the head-mounted display device of the disclosure, the first simulator has multiple nozzles and multiple corresponding regulators. Each regulator is driven by the controller to adjust the flow rate of air jetted from each nozzle. Therefore, the air jetted from the nozzle blows over the eyes and the vicinity of the eyes. The second simulator has a second transmission mechanism and a third transmission mechanism that rotate the second fan, so that the second fan can rotate to various angles and blow over the user's mouth. In addition, the first simulator and the second simulator may also have at least one of a thermoregulator, a humidity controller, and an odor controller. Such a design allows the user's eyes (upper face) and mouth (lower face) to feel the changing wind direction, the wind volume, different temperatures and humidity of the wind, and the odor of the wind corresponding to the virtual world when wearing the head-mounted display device, so as to provide a multi-sensory experience when the user is immersed in the virtual world.

What is claimed is:

1. A head-mounted display device comprising a main body and a first simulator connected to the main body, wherein the first simulator is used to cover eyes of a user, the first simulator comprises:
   a plurality of nozzles that face the eyes of the user, the plurality of nozzles are disposed inside the first simulator;
   a plurality of air channels;
   a first fan, configured to drive external air to flow to corresponding nozzles through the air channels; and
   a plurality of regulators, disposed between the air channels and the corresponding nozzles and configured to independently regulate flow rates of air jetted from the nozzles, wherein the air jetted from the nozzles is blown to an area of a face of the user covered by the first simulator.

2. The head-mounted display device according to claim 1, wherein the first simulator further comprises a connector and a controller, and the controller is driven by the main body through the connector to control the first fan and the regulators.

3. The head-mounted display device according to claim 1, wherein the first simulator further comprises a plurality of transmission modules configured to rotate the corresponding nozzles to change jetting directions of the nozzles.

4. The head-mounted display device according to claim 3, wherein each of the nozzles rotates around an axis, and the jetting direction of each of the nozzles does not overlap with the axis.

5. The head-mounted display device according to claim 4, wherein the jetting direction of each of the nozzles is not parallel to the axis.

6. The head-mounted display device according to claim 1, wherein the head-mounted display device further comprises a second simulator, and the second simulator comprises:
   a connector, configured to connect with the main body;
   a casing;
   a second fan, configured to blow wind toward a mouth of the user;
   a first transmission mechanism, connected to the casing and the second fan and configured to control movement of the second fan into and out of the casing;
   a second transmission mechanism, configured to control the second fan to rotate around a first axis; and
   a controller, controlled by the main body to drive the first transmission mechanism and the second transmission mechanism.

7. The head-mounted display device according to claim 6, wherein the second simulator further comprises a camera configured to detect a position of the mouth of the user.

8. The head-mounted display device according to claim 6, wherein the second simulator further comprises a third transmission mechanism configured to control the second fan to rotate around a second axis, and the first axis is perpendicular to the second axis.

9. The head-mounted display device according to claim 8, wherein a center of the second fan deviates from the first axis and the second axis.

10. The head-mounted display device according to claim 1, wherein the first simulator further comprises at least one of a thermoregulator, a humidity controller, and an odor controller, wherein the thermoregulator is configured to control a temperature of the air jetted from the nozzles, the humidity controller is configured to control humidity of the air jetted from the nozzles, and the odor controller is configured to control an odor of the air jetted from the nozzles.

11. A head-mounted display device comprising a main body and a simulator connected to the main body, wherein the simulator comprises:
   a connector, configured to connect with the main body;
   a casing;
   a fan, configured to blow wind toward a mouth of a user;
   a first transmission mechanism, connected to the casing and the fan and controlling movement of the fan into and out of the casing;
   a second transmission mechanism, configured to control the fan to rotate around a first axis; and
   a controller, controlled by the main body to drive the first transmission mechanism and the second transmission mechanism.

12. The head-mounted display device according to claim 11, wherein the simulator further comprises a camera configured to detect a position of the mouth of the user.

13. The head-mounted display device according to claim 11, wherein the simulator further comprises a third transmission mechanism configured to control the fan to rotate around a second axis, and the first axis is perpendicular to the second axis.

14. The head-mounted display device according to claim 13, wherein a center of the fan deviates from the first axis and the second axis.

15. The head-mounted display device according to claim 11, wherein the simulator further comprises at least one of a thermoregulator, a humidity controller, and an odor controller, wherein the thermoregulator is configured to control a temperature of air blown by the fan, the humidity controller is configured to control humidity of the air blown by the fan, and the odor controller is configured to control an odor of the air blown by the fan.

* * * * *